(12) United States Patent
Miller et al.

(10) Patent No.: US 10,830,390 B1
(45) Date of Patent: Nov. 10, 2020

(54) EXTENDABLE ELECTRONIC DEVICE HOLDER AND BRUSH

(71) Applicants: Sebastian Miller, New Albany, IN (US); Kenya Miller, New Albany, IN (US)

(72) Inventors: Sebastian Miller, New Albany, IN (US); Kenya Miller, New Albany, IN (US)

(*) Notice: Subject to any disclaimer, the term of this patent is extended or adjusted under 35 U.S.C. 154(b) by 3 days.

(21) Appl. No.: 16/402,549

(22) Filed: May 3, 2019

(51) Int. Cl.
| | |
|---|---|
| *A46B 5/00* | (2006.01) |
| *A46B 15/00* | (2006.01) |
| *G03B 17/56* | (2006.01) |
| *F16M 13/06* | (2006.01) |
| *F16M 13/04* | (2006.01) |
| *A45D 24/10* | (2006.01) |

(52) U.S. Cl.
CPC ............. *F16M 13/06* (2013.01); *A45D 24/10* (2013.01); *A46B 5/005* (2013.01); *A46B 15/00* (2013.01); *F16M 13/04* (2013.01); *G03B 17/561* (2013.01); *G03B 17/563* (2013.01)

(58) Field of Classification Search
CPC ...... A46B 5/005; A46B 15/00; A46B 15/0055; F16M 13/04; F16M 13/06; A45B 1/00; A45B 3/00; G03B 17/561; G03B 17/563
See application file for complete search history.

(56) References Cited

U.S. PATENT DOCUMENTS

| | | |
|---|---|---|
| D670,284 S | 11/2012 | Choi |
| 9,170,473 B1 | 10/2015 | Li |
| D767,011 S * | 9/2016 | Huang .................. D16/243 |
| D799,465 S | 10/2017 | Sukphist et al. |
| D803,932 S | 11/2017 | Martin et al. |
| 9,843,708 B2 | 12/2017 | Li |
| D806,780 S | 1/2018 | Martin et al. |
| 9,995,993 B2 * | 6/2018 | Li .................. B25J 15/0019 |
| 2013/0176412 A1 | 7/2013 | Chen |
| 2017/0010698 A1 | 1/2017 | Ibragimova et al. |
| 2017/0277021 A1 | 9/2017 | Sultan et al. |
| 2019/0075922 A1 * | 3/2019 | Rivera ................. A46B 17/08 |

* cited by examiner

*Primary Examiner* — Randall E Chin
(74) *Attorney, Agent, or Firm* — Cramer Patent & Design, PLLC; Aaron R. Cramer

(57) ABSTRACT

An extendable electronic device holder includes a telescoping rod portion having a handle at a first end and a head portion capable of holding a portable electronic device attached to a second end with an attachment feature. Located on the head portion is a hair brush feature.

20 Claims, 4 Drawing Sheets

EXTENDABLE ELECTRONIC DEVICE HOLDER AND BRUSH

RELATED APPLICATIONS

None.

FIELD OF THE INVENTION

The present invention relates generally to an electronic device holder. Specifically, to an extendable electronic device holder and brush.

BACKGROUND OF THE INVENTION

One accessory commonly seen in use with digital cameras and smart phones is that of the "selfie stick". This accessory is an extended pole that allows the camera to be placed up to three feet or more away from the user. This allows for capturing of images that would otherwise be unobtainable. Such poles can also be used to take self-images as well. As the device definition implies, the user themselves is typically in the picture itself. This would dictate that the person wants to look their best, including their hair, which may be windswept or out of place, especially in an outdoor environment.

While a user will always have their cellphone and a selfie stick with them, since they want to take a selfie, they may not have a hair brush. As such, the user must try to comb their hair with their fingers, or simply do without, thus sacrificing the quality of the captured image. Accordingly, there exists a need for a means by which a person taking a selfie can always have the capabilities of a hair brush close at hand. The development of the extendable electronic device holder and brush fulfills this need.

SUMMARY OF THE INVENTION

The principles of the present invention provide for a portable electronic device holder, comprising a telescoping rod portion which is capable of selectively extending and retracting between a fully extended state and a fully retracted state. The telescoping rod portion incorporates a plurality of rod segments manufactured out of hollow cylindrical tubing. The rod segments include a first telescoping rod segment, a second telescoping rod segment, a third telescoping rod segment, a fourth telescoping rod segment, and a fifth telescoping rod segment.

The first telescoping rod segment is located at a second end of the telescoping rod portion and has a first end that is capped with a first rod end and has a first diameter. A second rod segment has a second diameter smaller than the first diameter and a first end that is slidably attached to a second end of the first rod segment. The third rod segment has a third diameter smaller than the second diameter and a first end that is slidably attached to a second end of the second rod segment. The fourth rod segment has a fourth diameter smaller than the third diameter and a first end that is slidably attached to a second end of the third rod segment. The fifth rod segment has a fifth diameter smaller than the fourth diameter and a first end that is slidably attached to a second end of the fourth rod segment. The second rod end caps the second end of the fifth rod segment. The rod segments are incrementally extendable between the adjacent rod segment.

A portable electronic device holder also comprises a pair of arms that are coextensive with and integrally formed or affixed to the diameter of an upper surface of the second rod end. Additionally, there is a head portion which is pivotally mounted to a first end of the telescoping rod portion with an attachment feature. The attachment feature pivotally connects the head portion to the second rod end to enable the attachment feature and the head portion to extend longitudinally therefrom. The head portion holds the portable electronic device. The attachment feature and the second rod end are integrally attached components or portions of a unitary construction. The head portion includes a rear holder element that has a planar front face capable of abutting against the portable electronic device when secured in the head portion. The attachment feature has a curvilinear rear side and a bottom rear extension portion that is affixed to or is integral with the second rod end. The upper end of the attachment feature transitions in a curvilinear manner from the rear side to the front side.

The portable electronic device holder also comprises a notch which is formed on the attachment feature. The notch extends from the front side towards the rear side and terminates halfway of the thickness of the attachment feature and terminates at an upper end at the midpoint of the height thereof. Additionally, there is a generally U-shaped upper holder element having a first leg with a first end and a second leg with a first end, the first leg and the second leg are pivotally attached to the side holder elements via a first pivot feature and a second pivot feature respectively. The first leg and the second leg each extends forwardly, and a bridge interconnects the second ends of the first leg and the second leg, the first and second pivot features work simultaneously to pivot the upper holder element relative to the first and second side holder elements between a downward position. The upper holder element is perpendicular to the rear holder element and side holder elements and an upward position. The upper holder element is a linear extension of the rear holder element and side holder elements. The upper holder element is in the downward position. The forward side of the bridge portion extends farther than the forward-facing portion of the side holder elements.

The portable electronic device holder also comprises a lower holder element pivotally attached to a center point of the bottom edge of the rear holder element via a third pivot feature. The lower holder element has a decreasing thickness from front edge to rear edge, wherein the rear edge terminates prior to the abutment against the rear holder element. The front edge of the lower holder element is generally coextensive with the upper holder element when the upper holder element in the downward position. The tapering thickness of the lower holder element provides for a cradling means so that a front leading edge of the lower holder element aids in maintaining the positional security of the portable electronic device. The lower holder element is slightly biased towards to the rear holder element about the third pivot feature to maintain positional security of the portable electronic device when retained. An adjustment feature provides a selective pivotal positing of the entire head portion relative to the attachment feature which can enable the head portion to pivot in a forward direction or a rearward direction relative to the attachment feature and loosening of the adjustment feature enables the head portion to be positioned as desired. A securing feature is also provided which can secure the head portion at the desired position relative to the attachment feature without subsequent movement thereof.

The device may also comprise a common bisecting centerline that traverses longitudinally through the telescoping rod portion, the attachment feature, and the head portion that provides a symmetrical configuration to the portable electronic device holder. The rear side of the rear holder element may be curvilinear and serves as a bed for a plurality of bristles. The bristles each may have a first end adhered, attached, affixed, or otherwise bonded to the rear side of the rear holder element and extend outward in a radial pattern. Additionally, the bristles each may have a first end adhered, attached, affixed, or otherwise bonded to the rear side of the rear holder element and extend outward in a linear pattern. The telescoping rod portion, the attachment feature, and the head portion may each be manufactured out of a resilient lightweight material.

The telescoping rod portion, the attachment feature, and the head portion may each be manufactured out of a resilient weatherproof material. The device may also comprise a means for brushing hair of an individual while posing for a selfie. Located at the midpoint of the bridge and extending perpendicularly away may be a tab. The tab enables a user to grasp the upper holder element and selectively manipulate it to the downward position or to grasp the upper holder element and selectively manipulate it to the upward position. The third pivot feature may generally be a rectangular element that is pivotally attached to the lower holder element within a notch on the rear side thereof.

A tang may depend downward from the center point of a bottom of the third pivot feature and has an aperture that enables the adjustment feature to pass through. The attachment feature may be a threaded shank with a gripping means located on an end while the securing feature may be a hex nut capable of threaded adjustment on the threaded shank. A switch may be located adjacent the first rod end on the first rod segment. The switch may be capable of being in wireless electronic communication with the portable electronic device to enable activation of the camera function on the portable electronic device. The upper holder element, the rear holder element, the lower holder element, and the side holder elements may be covered in cushioning to minimize or restrict damage to the portable electronic device. The upper holder element, the rear holder element, the lower holder element, and the side holder elements may be covered in a protective covering to minimize or restrict damage to the portable electronic device. The portable electronic device holder may be commonly used to hold a smart phone with a camera function prior to posing for and actuating the camera function of the phone.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
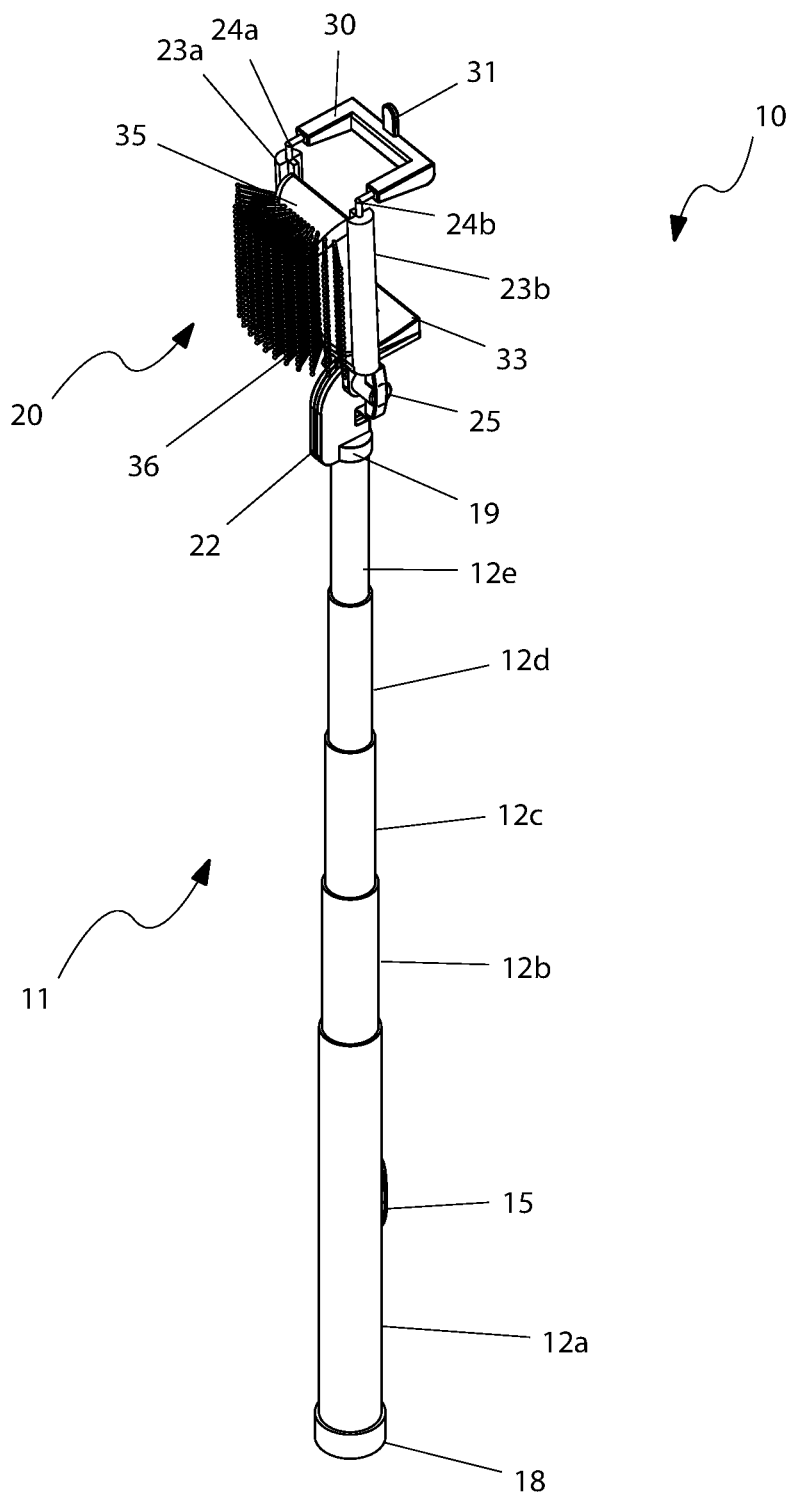
FIG. 1 is a rear top perspective view of a portable electronic device holder 10, according to a preferred embodiment of the present invention.

DESCRIPTIVE KEY 10 portable electronic device holder
11 telescoping rod portion
12a first rod segment
12b second rod segment
12c third rod segment
12d fourth rod segment
12e fifth rod segment
15 switch
18 first rod end
19 second rod end
20 head portion
22 attachment feature
23a first side holder element
23b second side holder element
24a first pivot feature
24b second pivot feature
25 adjustment feature
26 securing feature
27 tang
30 upper holder element
31 tab
34 third pivot feature
33 lower holder element
35 rear holder element
36 bristle

DESCRIPTION OF THE PREFERRED EMBODIMENTS

The best mode for carrying out the invention is presented in terms of its preferred embodiment, herein depicted within FIGS. 1 through 4b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) configuration shall be shown and described for purposes of clarity and disclosure and not by way of limitation of scope. All the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 2:
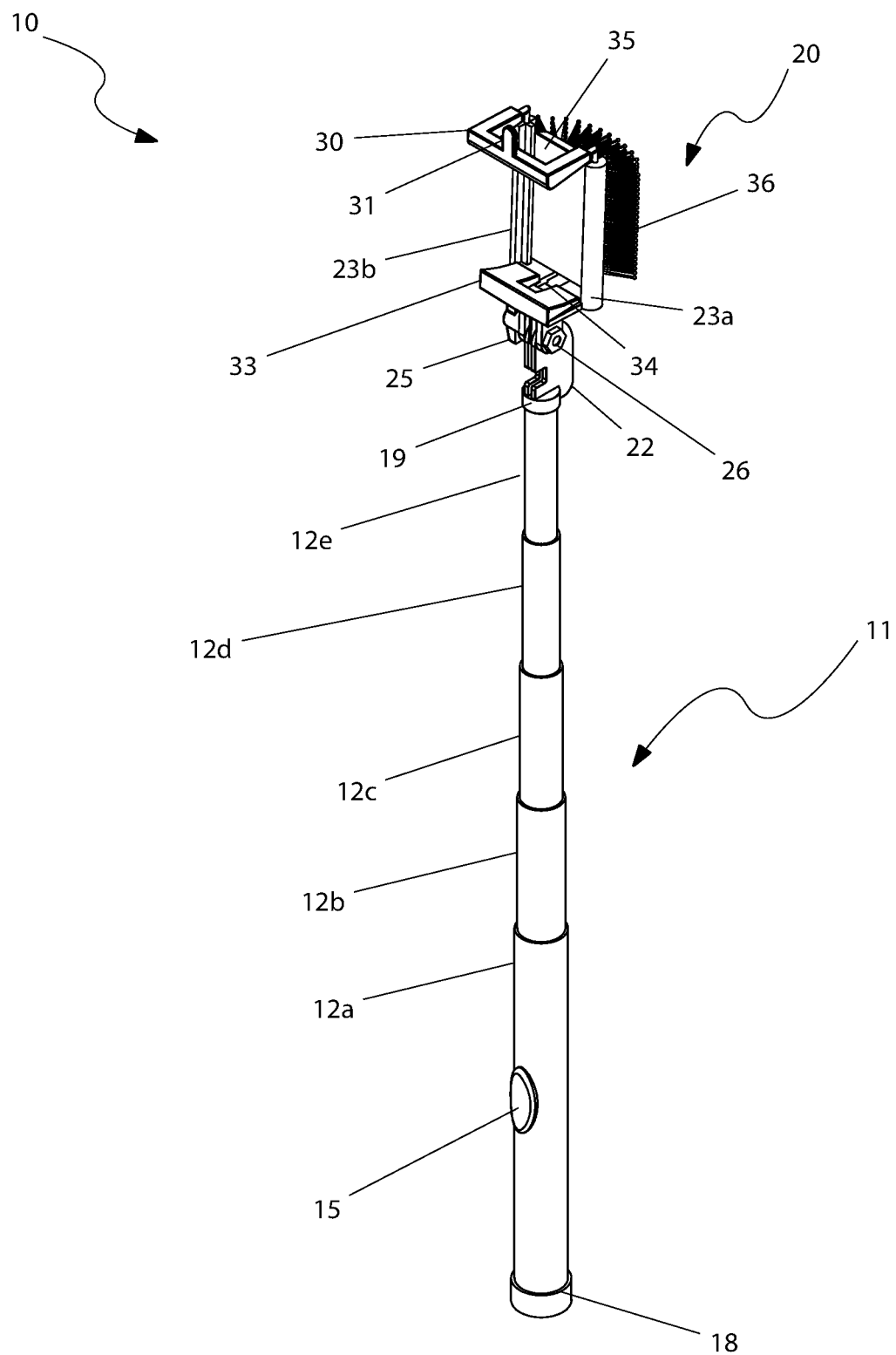
FIG. 2 is a front top perspective view of the portable electronic device holder 10, according to the preferred embodiment of the present invention.
Figure 3:
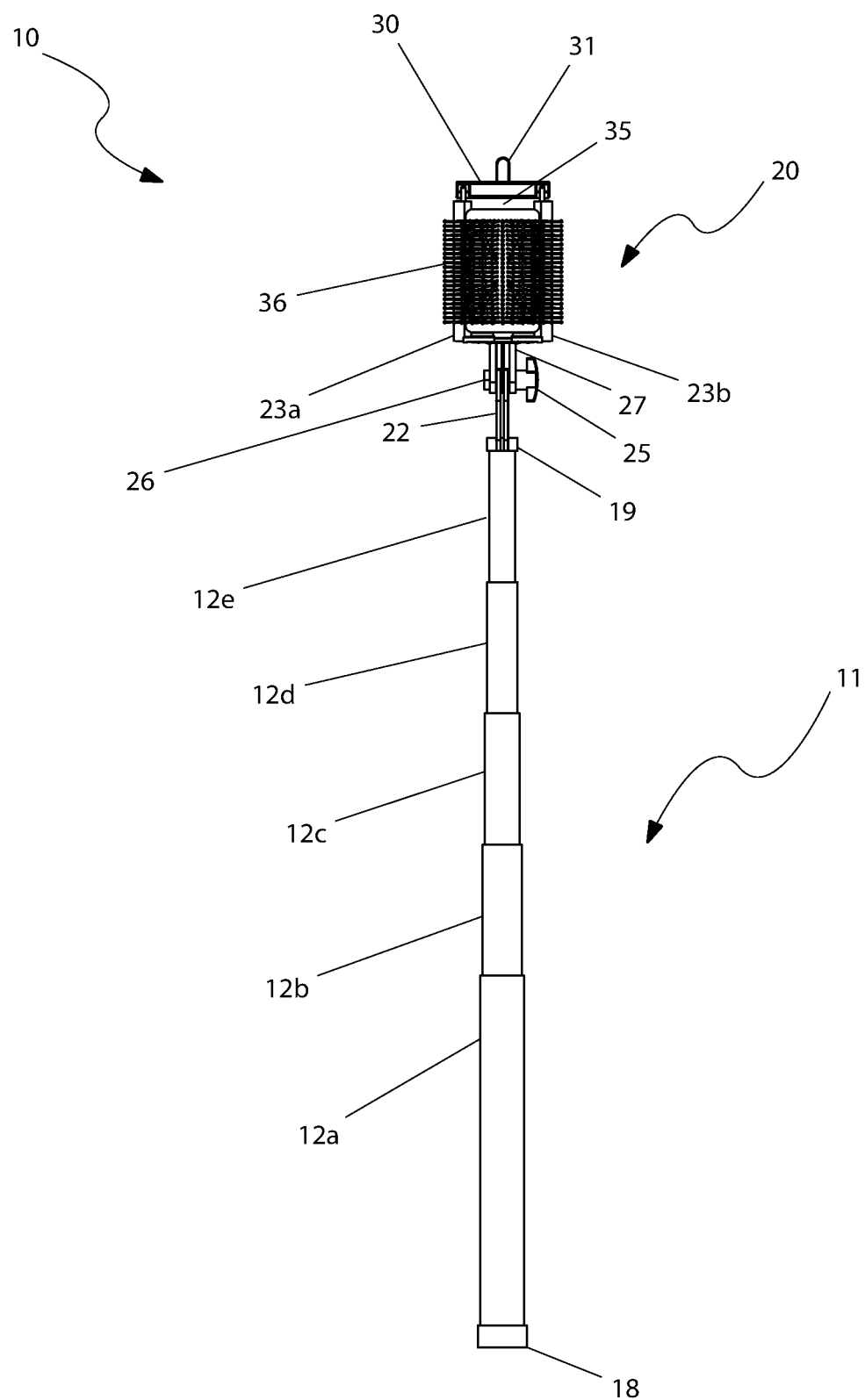
FIG. 3 is a rear view of the portable electronic device holder 10, according to the preferred embodiment of the present invention.

Referring now to FIGS. 1-3, various views of the portable electronic device holder (herein described as the "holder") 10, is shown. The holder 10 includes a telescoping rod portion 11 that is capable of being selectively extended and retracted between a fully extended and a fully retracted state, and a head portion 20 that is pivotally mounted to a first end of the telescoping rod portion 11 (please refer to FIGS. 4a and 4b) with an attachment feature 22. The holder 10 is commonly known as a "selfie stick" and is commonly used to hold a portable electronic device, such as smart phone with a camera function, prior to posing for and actuating the camera function of the phone, particularly during a self-taken photograph, or "selfie". The head portion 20 holds the portable electronic device and has a means to brush the hair of the individual posing for the "selfie".

The telescoping rod portion 11 incorporates a plurality of rod segments 12a, 12b, 12c, 12d, 12e, preferably manufactured out of hollow cylindrical tubing. The hollow features provide a light weight to the holder 10. The first telescoping rod segment 12a is located at a second end of the telescoping rod portion 11 and has a first end that is capped with a first rod end 18 and has a first diameter. A second rod segment 12b has a second diameter smaller than the first diameter and a first end that is slidably attached to a second end of the first rod segment 12a. A third rod segment 12c has a third diameter smaller than the second diameter and a first end that is slidably attached to a second end of the second rod segment 12b. A fourth rod segment 12d has a fourth diameter smaller than the third diameter and a first end that is slidably attached to a second end of the third rod segment 12c. A fifth rod segment 12e has a fifth diameter smaller than the fourth diameter and a first end that is slidably attached to a second end of the fourth rod segment 12d. A second rod end 19 caps the second end of the fifth rod segment 12e.

Although the exemplary embodiment herein depicts five (5) individual rod segments, in fact there may be as desired by the manufacture and any number can still fall under the overall scope of the present invention. The individual rod segments 12a, 12b, 12c, 12d, 12e can be incrementally extendable between the adjacent rod segment 12a, 12b, 12c, 12d, 12d or only fully extended or fully retracted within and without the adjacent rod segment 12a, 12b, 12c, 12d, 12e. Further, there may be in certain embodiments the means to secure an individual rod segment 12a, 12b, 12c, 12d, 12e to an adjacent rod segment 12a, 12b, 12c, 12d, 12e if so desired.

Attached to the second rod end 19, opposite the telescoping rod portion 11, is the head portion 20. Specifically, the attachment feature 22 pivotally connects the head portion 20 to the second rod end 19 to enable the attachment feature 22 and head portion 20 to extend longitudinally therefrom. In other embodiments, the attachment feature 22 and the second rod end 19 are integrally attached components or portions of a unitary construction. It is appreciated that a common bisecting centerline that traverses longitudinally through the telescoping rod portion 11, attachment feature 22, and head portion 20 provides a symmetrical configuration to the holder 10 in a preferred embodiment.

The attachment feature 22 has a curvilinear rear side and a bottom rear extension portion that is affixed to or integral with the second rod end 19. On the front side, there are a pair of arms that are coextensive with and integrally formed with or affixed to the diameter of the upper surface of the second rod end 19. A notch is formed on the attachment feature 22 and extends from the front side towards the rear side and terminates approximately halfway of the thickness of the attachment feature 22 and terminates at an upper end at approximately the midpoint of the height thereof. The upper end of the attachment feature 22 transitions in a curvilinear manner from the rear side to the front side.

As aforementioned, the head portion 20 is pivotally attached to the attachment feature 22. The head portion 20 is particularly suited to securely hold most conventional makes and models of smartphones, tablets, and cameras that are preferably in a general rectangular shape. The head portion 20 includes a rear holder element 25 that has a planar front face capable of abutting against a portable electronic device when secured in the head portion 20. The rear side of the rear holder element 35 is curvilinear and serves a bed for a plurality of bristles 36. The plurality of bristles 36 each have a first end adhered, attached, affixed, or otherwise bonded to the rear side of the rear holder element 35 and may extend outward (i.e. rearward) in a radial or linear pattern. The bristles 36 can be any material, either hard or soft, and can be formed as an integral part of the rear holder element 35 or separate materials therefrom.

Located coextensive with a first side of the rear holder element 35 is a first side holder element 23a. Located coextensive with a second side of the rear holder element 35 is a second side holder element 23b. In the exemplary embodiment, the first and second side holder elements 23a, 23b are generally cylindrical in shape but can also be rectangular prisms, or any other shape. A forward-facing portion of each of the first and second side holder elements 23a, 23b are coextensive with each other and extend past the front face of the rear holder element 35. In the exemplary embodiment, the first side holder element 23a is located on the right side and the second side holder element 23b is located on the left of the rear holder element 35.

An upper holder element 30 is generally "U"-shaped, wherein first ends of a first leg and a second leg is pivotally attached to the side holder elements 23a, 23b via a first pivot feature 24a, and a second pivot feature 24b, respectively. The first leg and second leg each extends forwardly, and a bridge interconnects the second ends of the two (2) legs. The first and second pivot features 24a, 24b work simultaneously to pivot the upper holder element 30 relative to the first and second side holder elements 23a, 23b between a downward position, where the upper holder element 30 is perpendicular to the rear holder element 35 and side holder elements 23a, 23b, and an upward position, where the upper holder element 30 is a linear extension of the rear holder element 325 and side holder elements 23a, 23b. When the upper holder element 30 is in the downward position, the forward side of the bridge portion extends farther than the forward-facing portion of the side holder elements 23a, 23b. Located at the midpoint of the bridge, and extending perpendicularly away (i.e., parallel with the rear holder element 354 and side holder elements 23a, 23b when the upper holder element 35 is in the downward position) is a tab 31. The tab 31 enables a user to grasp the upper holder element 35 and selectively manipulate it to either the downward or upward positions.

A lower holder element 33 is pivotally attached to the center point of the bottom edge of the rear holder element 35 via a third pivot feature 24. The lower holder element 33 has a decreasing thickness from front edge to rear edge, wherein the rear edge terminates prior to the abutment against the rear holder element 35. The front edge of the lower holder element 33 is generally coextensive with the upper holder element 30 when the upper holder element 30 in the downward position. The third pivot feature 34 is preferably a generally rectangular element that is pivotally attached to the lower holder element 33 within a notch on the rear side thereof. The tapering thickness of the lower holder element 33 provides for a cradling means so that a front leading edge of the lower holder element 33 aids in maintaining the positional security of the portable electronic device. Also, in certain embodiments, the lower holder element 33 can be slightly biased towards to the rear holder element 35 about the third pivot feature 34 to maintain positional security of the portable electronic device when retained therein.

Figure 4A:
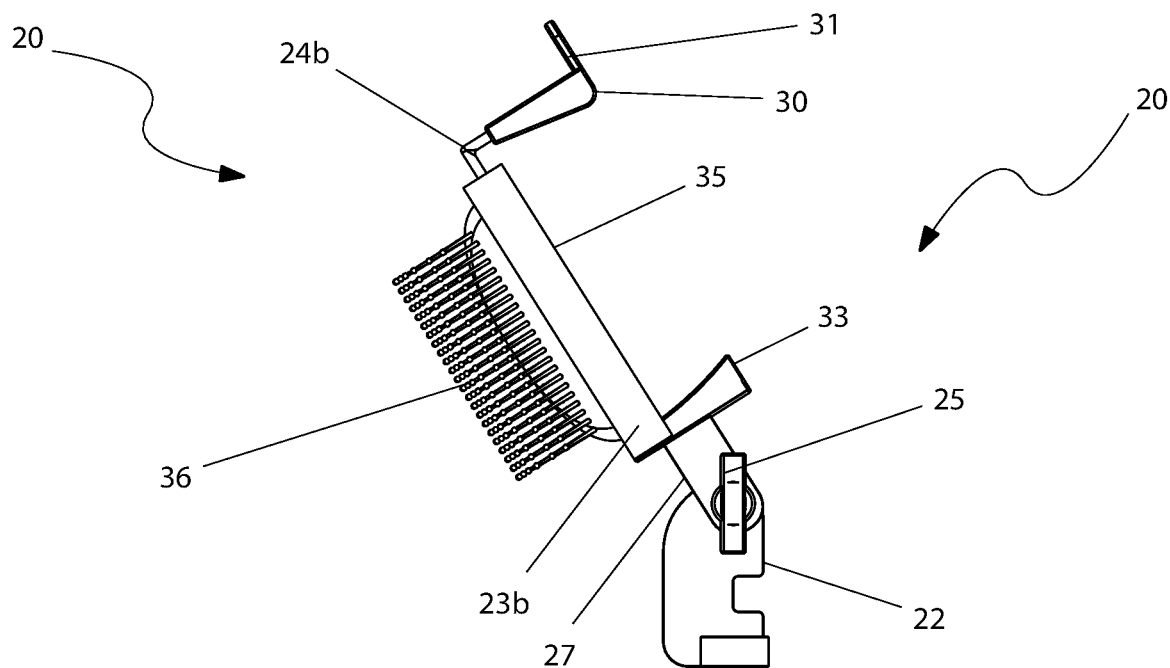
FIG. 4a is a close-up side view of the head portion 20 deflected towards a first side of the telescoping rod portion 11, according to the preferred embodiment of the present invention; and, FIG. 4b is a close-up side view of the head portion 20 deflected towards a second side of the telescoping rod portion 11, according to the preferred embodiment of the present invention.
Figure 4B:
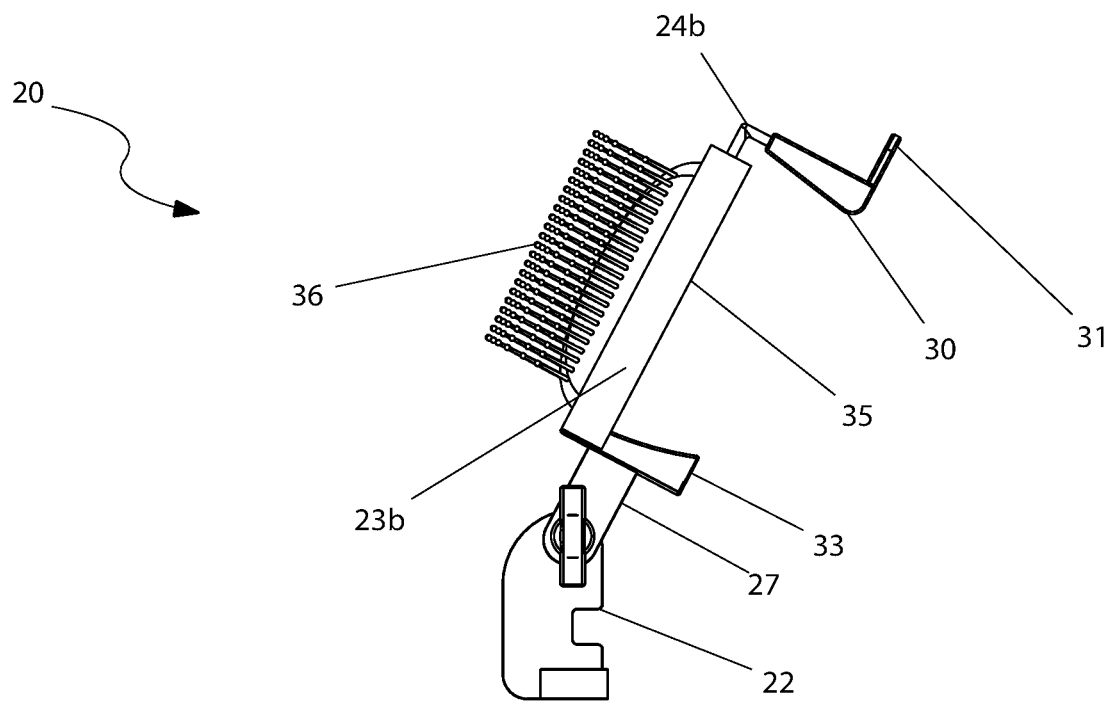

An adjustment feature 25 provides a selective pivotal positing of the entire head portion 230 relative to the attachment feature 22. FIGS. 4a and 4b illustrate this positioning, which can enable the head portion 20 to pivot in a forward or a rearward direction relative to the attachment feature 22, due to prevailing environmental concerns and subject positioning during the act of taking the photograph. A tang 27 depends downward from a center point of a bottom of the third pivot feature 34 and has an aperture that enables the adjustment feature 25 to pass through. Loosening of the adjustment feature 25 enables the head portion 20 to be positioned as desired. The attachment feature 25 is preferably a threaded shank with a gripping means located on an end. A securing feature 26 can secure the head portion 20 at the desired position relative to the attachment feature 22 without subsequent movement thereof. Such a securing feature 26 can be a hex nut capable of threaded adjustment on the threaded shank of the preferred embodiment.

The telescoping rod portion 11, attachment feature 22, and head portion 20 are each preferably manufactured out of a resilient lightweight and weatherproof material. Some or all portions of the holder 10 can be metallic and with or without a coating adhered to it to protect it from the elements. In preferred embodiments, a switch 15 is located adjacent the first rod end 18 on the first rod segment 12a. The switch 15 is capable of being in wireless electronic communication with the portable electronic device, such as Bluetooth, to enable activation of the camera function on the portable electronic device, particularly when the telescoping rod portion 11 is fully extended. Also, any or all the upper holder element 30, rear holder element 35, lower holder element 33, and side holder elements 23a, 23b can be covered in a cushioning or protective cover to minimize or restrict damage to the portable electronic device.

2. Operation of the Preferred Embodiment

In a preferred method of operation, upon determining the location and the subject of the photograph, the subject grasps the telescoping rod portion 11 and preferably retracts all segments 12a, 12b, 12c, 12cd, 12d to the fully retracted position. Then, the desired portable electronic device that is performing the camera function is secured within the head portion 20. Depending on the specific shape and size of the portable electronic device, manipulation of the upper holder element 30 and lower holder element 33 may be selectively pivotally positioned. The sides of the portable electronic device abut the first and second side holder elements 23, 23b and the rear of the portable electronic device abuts the front surface of the rear holder element 35. The lower holder element 33 can be pivotally deflected away from the rear holder element 35 (in embodiments where the lower holder element 33 is biased towards the rear holder element 35) to enable the bottom of the portable electronic device to be seated therein. The upper holder element 30 is then selectively positioned on the top of the portable electronic device. The tab 31 is particularly suited for fitting the upper holder element 30 against the top of the portable electronic device. The switch 15 can then be placed in wireless communication with the camera application of the portable electronic device.

Once the portable electronic device is secured in the head portion 20, pivotal manipulation of the combined head portion 20 and portable electronic device can be selectively positioned via loosening of the adjustment feature 25, selectively positioning the combined head portion 20 and portable electronic device, and securing said desired position with the securing feature 26. The telescoping rod portion 11 can be extended to any desired length and secured if desired. The switch 15 can then be activated to produce the functions of the camera application of the portable electronic device. If so desired, the bristles 36 can act as a brush for the hair of the subject being photographed prior to the activation of the camera.

The foregoing descriptions of specific embodiments of the present invention have been presented for purposes of illustration and description. They are not intended to be exhaustive or to limit the invention to the precise forms disclosed, and obviously many modifications and variations are possible considering the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable electronic device holder, comprising:
a telescoping rod portion selectively extended and retracted between a fully extended state and a fully retracted state, the telescoping rod portion incorporates a plurality of rod segments manufactured out of hollow cylindrical tubing, the rod segments include a first telescoping rod segment, a second telescoping rod segment, a third telescoping rod segment, a fourth telescoping rod segment, and a fifth telescoping rod segment, the first telescoping rod segment is located at a second end of the telescoping rod portion and has a first end that is capped with a first rod end and has a first diameter, a second rod segment has a second diameter smaller than the first diameter and a first end that is slidably attached to a second end of the first rod segment, the third rod segment has a third diameter smaller than the second diameter and a first end that is slidably attached to a second end of the second rod segment, the fourth rod segment has a fourth diameter smaller than the third diameter and a first end that is slidably attached to a second end of the third rod segment, the fifth rod segment has a fifth diameter smaller than the fourth diameter and a first end that is slidably attached to a second end of the fourth rod segment, the second rod end caps the second end of the fifth rod segment, the rod segments are incrementally extendable between the adjacent rod segment;
a pair of arms that are coextensive with and integrally formed or affixed to the diameter of an upper surface of the second rod end;
a head portion pivotally mounted to a first end of the telescoping rod portion with an attachment feature, the attachment feature pivotally connects the head portion to the second rod end to enable the attachment feature and the head portion to extend longitudinally therefrom, the head portion holds the portable electronic device, the attachment feature and the second rod end are integrally attached components or portions of a unitary construction, the head portion includes a rear holder element that has a planar front face capable of abutting against the portable electronic device when secured in the head portion, the attachment feature has a curvilinear rear side and a bottom rear extension portion that is affixed to or is integral with the second rod end, the upper end of the attachment feature transitions in a curvilinear manner from the rear side to the front side;

a notch formed on the attachment feature, the notch extends from the front side towards the rear side and terminates halfway of the thickness of the attachment feature and terminates at an upper end at the midpoint of the height thereof;

a generally U-shaped upper holder element having a first leg with a first end and a second leg with a first end, the first leg and the second leg are pivotally attached to side holder elements via a first pivot feature and a second pivot feature respectively, the first leg and the second leg each extends forwardly and a bridge interconnects the second ends of the first leg and the second leg, the first and second pivot features work simultaneously to pivot the upper holder element relative to the first and second side holder elements between a downward position, the upper holder element is perpendicular to the rear holder element and side holder elements and an upward position, the upper holder element is a linear extension of the rear holder element and side holder elements, the upper holder element is in the downward position, the forward side of the bridge portion extends farther than the forward-facing portion of the side holder elements;

a lower holder element pivotally attached to a center point of the bottom edge of the rear holder element via a third pivot feature, the lower holder element has a decreasing thickness from front edge to rear edge, wherein the rear edge terminates prior to the abutment against the rear holder element, the front edge of the lower holder element is generally coextensive with the upper holder element when the upper holder element in the downward position, the tapering thickness of the lower holder element provides for a cradling means so that a front leading edge of the lower holder element aids in maintaining the positional security of the portable electronic device, the lower holder element is slightly biased towards to the rear holder element about the third pivot feature to maintain positional security of the portable electronic device when retained therein;

an adjustment feature provides a selective pivotal positing of the entire head portion relative to the attachment feature which can enable the head portion to pivot in a forward direction or a rearward direction relative to the attachment feature and loosening of the adjustment feature enables the head portion to be positioned as desired; and a securing feature securing the head portion at the desired position relative to the attachment feature without subsequent movement thereof.

2. The portable electronic device holder according to claim 1, further comprising a common bisecting centerline that traverses longitudinally through the telescoping rod portion, the attachment feature, and the head portion that provides a symmetrical configuration to the portable electronic device holder.

3. The portable electronic device holder according to claim 1, wherein the rear side of the rear holder element is curvilinear and serves as a bed for a plurality of bristles.

4. The portable electronic device holder according to claim 3, wherein the bristles each have a first end adhered, attached, affixed, or otherwise bonded to the rear side of the rear holder element and extend outward in a radial pattern.

5. The portable electronic device holder according to claim 3, wherein the bristles each have a first end adhered, attached, affixed, or otherwise bonded to the rear side of the rear holder element and extend outward in a linear pattern.

6. The portable electronic device holder according to claim 1, wherein the telescoping rod portion, the attachment feature, and the head portion are each manufactured out of a resilient lightweight material.

7. The portable electronic device holder according to claim 1, wherein the telescoping rod portion, the attachment feature, and the head portion are each manufactured out of a resilient weatherproof material.

8. The portable electronic device holder according to claim 1, further comprising a means for brushing hair of an individual while posing for a selfie.

9. The portable electronic device holder according to claim 1, wherein located at the midpoint of the bridge and extending perpendicularly away is a tab.

10. The portable electronic device holder according to claim 9, wherein the tab enables a user to grasp the upper holder element and selectively manipulate it to the downward position.

11. The portable electronic device holder according to claim 9, wherein the tab enables a user to grasp the upper holder element and selectively manipulate it to the upward position.

12. The portable electronic device holder according to claim 1, wherein the third pivot feature is a generally rectangular element that is pivotally attached to the lower holder element within a notch on the rear side thereof.

13. The portable electronic device holder according to claim 1, further comprising a tang depends downward from the center point of a bottom of the third pivot feature and has an aperture that enables the adjustment feature to pass through.

14. The portable electronic device holder according to claim 1, wherein the attachment feature is a threaded shank with a gripping means located on an end.

15. The portable electronic device holder according to claim 14, wherein the securing feature is a hex nut capable of threaded adjustment on the threaded shank.

16. The portable electronic device holder according to claim 1, further comprising a switch located adjacent the first rod end on the first rod segment.

17. The portable electronic device holder according to claim 16, wherein the switch is capable of being in wireless electronic communication with the portable electronic device to enable activation of the camera function on the portable electronic device.

18. The portable electronic device holder according to claim 1, wherein the upper holder element, the rear holder element, the lower holder element, and the side holder elements are covered in cushioning to minimize or restrict damage to the portable electronic device.

19. The portable electronic device holder according to claim 1, wherein the upper holder element, the rear holder element, the lower holder element, and the side holder elements are covered in a protective covering to minimize or restrict damage to the portable electronic device.

20. The portable electronic device holder according to claim 1, wherein the portable electronic device holder is commonly used to hold a smart phone with a camera function prior to posing for and actuating the camera function of the phone.

* * * * *